(12) United States Patent
Imamura et al.

(10) Patent No.: US 11,227,519 B2
(45) Date of Patent: Jan. 18, 2022

(54) IMAGE PROJECTION APPARATUS, IMAGE PROJECTION METHOD, IMAGE DISPLAY LIGHT OUTPUT CONTROL METHOD BY ACQUIRING PUPIL AREA OR SIZE

(71) Applicant: SONY CORPORATION, Tokyo (JP)

(72) Inventors: Teppei Imamura, Kanagawa (JP); Katsuyuki Akutsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/963,895

(22) PCT Filed: Dec. 27, 2018

(86) PCT No.: PCT/JP2018/048035
§ 371 (c)(1),
(2) Date: Jul. 22, 2020

(87) PCT Pub. No.: WO2019/146367
PCT Pub. Date: Aug. 1, 2019

(65) Prior Publication Data
US 2021/0035478 A1 Feb. 4, 2021

(30) Foreign Application Priority Data
Jan. 29, 2018 (JP) .............................. JP2018-012996

(51) Int. Cl.
*G09G 3/02* (2006.01)
*G06T 7/70* (2017.01)
*G02B 27/00* (2006.01)

(52) U.S. Cl.
CPC ........... *G09G 3/02* (2013.01); *G02B 27/0093* (2013.01); *G06T 7/70* (2017.01);
(Continued)

(58) Field of Classification Search
CPC .... G02B 2027/0118; G02B 2027/0138; G02B 27/0093; G02B 27/0172; G02B 26/101;
(Continued)

(56) References Cited

U.S. PATENT DOCUMENTS

| 5,993,000 A | 11/1999 | Kobayashi et al. |
| 2010/0097580 A1* | 4/2010 | Yamamoto ......... G02B 27/0172 353/69 |

(Continued)

FOREIGN PATENT DOCUMENTS

| JP | H05-300451 | 11/1993 |
| JP | H11-044862 | 2/1999 |

(Continued)

OTHER PUBLICATIONS

International Search Report prepared by the Japan Patent Office dated Mar. 11, 2019, for International Application No. PCT/JP2018/048035.

(Continued)

*Primary Examiner* — Richard J Hong
(74) *Attorney, Agent, or Firm* — Sheridan Ross P.C.

(57) ABSTRACT

The present technology provides an image projection apparatus including a pupil information acquisition section that acquires a pupil area or size, and an output control section that controls an output of image display light being collected around the pupil and irradiated on a retina on the basis of the pupil area or size acquired by the pupil information acquisition section. In addition, the present technology provides an image projection method including a step of acquiring pupil information to acquire a pupil area or size, a step of controlling an output of the image display light collected around a pupil and irradiated to a retina on the basis of a pupil area or size acquired in the step of acquiring pupil information, and a step of outputting image display light that (Continued)

irradiates the retina with the image display light at the output controlled in the step of controlling the output.

20 Claims, 8 Drawing Sheets

(52) U.S. Cl.
CPC .............. *G06T 2207/10048* (2013.01); *G09G 2320/0626* (2013.01); *G09G 2360/16* (2013.01)

(58) Field of Classification Search
CPC ........ G02B 27/017; G06T 2207/10048; G06T 7/70; G09G 2320/0626; G09G 2360/16; G09G 3/02; G09G 5/02; A61B 3/113; H04N 9/097; H04N 19/17; G06F 3/005
See application file for complete search history.

(56) References Cited

U.S. PATENT DOCUMENTS

| | | | |
|---|---|---|---|
| 2010/0177114 A1* | 7/2010 | Nakashima | G02B 27/017 345/589 |
| 2012/0280956 A1* | 11/2012 | Yamamoto | G02B 26/101 345/204 |
| 2013/0114043 A1* | 5/2013 | Balan | A61B 3/113 351/210 |
| 2014/0192092 A1 | 7/2014 | Aruga et al. | |
| 2016/0209856 A1 | 7/2016 | Urey | |
| 2018/0129050 A1* | 5/2018 | Hayashi | H04N 9/097 |
| 2018/0309955 A1* | 10/2018 | Lawrence | H04N 19/17 |
| 2018/0365875 A1* | 12/2018 | Yildiz | G06F 3/005 |
| 2019/0265785 A1* | 8/2019 | Ho | G09G 5/02 |

FOREIGN PATENT DOCUMENTS

| | | |
|---|---|---|
| JP | 2008-089934 | 4/2008 |
| JP | 2010-164782 | 7/2010 |
| JP | 2014-132305 | 7/2014 |
| JP | 2016-528533 | 9/2016 |
| JP | 2017-161759 | 9/2017 |
| WO | WO 2013/067230 | 5/2013 |

OTHER PUBLICATIONS

Lin et al., "Retinal projection head-mounted display," Optoelectronics, vol. 10, No. 1, Mar. 17, 2017, pp. 1-8.

Extended European Search Report for European Patent Application No. 18902217.1, dated Mar. 5, 2021, 9 pages.

* cited by examiner

IMAGE PROJECTION APPARATUS, IMAGE PROJECTION METHOD, IMAGE DISPLAY LIGHT OUTPUT CONTROL METHOD BY ACQUIRING PUPIL AREA OR SIZE

CROSS REFERENCE TO RELATED APPLICATIONS

This application is a national stage application under 35 U.S.C. 371 and claims the benefit of PCT Application No. PCT/JP2018/048035 having an international filing date of 27 Dec. 2018, which designated the United States, which PCT application claimed the benefit of Japanese Patent Application No. 2018-012996 filed 29 Jan. 2018, the entire disclosures of each of which are incorporated herein by reference.

TECHNICAL FIELD

The present technology relates to an image projection apparatus, an image projection method, and an image display light output control method, and, more particularly, to an image projection apparatus and an image projection method in which image display light is collected around a pupil and is irradiated to a retina, and an image display light output control method of controlling an output of the image display light collected around the pupil and irradiated to the retina.

BACKGROUND ART

In recent years, a technology of superimposing an image on an external scene, e.g., a real landscape, and displaying draws an attention. The technology is also called as an augmented reality (AR) technology. One example product obtained by using the technology is a head mount display. The head mount display is used by being worn by a user's head. In an image display method by using the head mount display, a user's eye is irradiated with light from the head mount display, for example, in addition to external light, to thereby superimposing an image on an external image and displaying.

For example, Patent Literature 1 describes an invention relating to a transmissive image display apparatus. The transmissive image display apparatus includes an image display section which displays the image, an optical means which guides the image to the user's eye, a light control filter which makes the transmittance of external light variable and adjusts the light intensity of the external light reaching the user's eye, a pupil imaging camera which images the pupil of the user's eye, and a control section which calculates a pupil diameter of the pupil on the basis of an imaging signal from a pupil imaging means and adjusts each of transmittance of the light control filter and a light intensity of the image of the image display section on the basis of the calculated value of the pupil diameter.

CITATION LIST

Patent Literature

Patent Literature 1: Japanese Patent Application Laid-open No. 2017-97098

DISCLOSURE OF INVENTION

Technical Problem

Along with an increase in an interest toward the AR technology, it needs a better image projection method. For example, it needs to present a clearer image to the user and to present a more readily visible image to the user.

An object of the present technology is to provide a new image projection technology.

Solution to Problem

The present inventors found that it is possible to display an image having adequate lightness and clearness superimposed on an external scene for a user by an image projection technology having a specific structure.

Specifically, the present technology provides an image projection apparatus including a pupil information acquisition section that acquires a pupil area or size, and an output control section that controls an output of image display light being collected around the pupil and irradiated on a retina on the basis of the pupil area or size acquired by the pupil information acquisition section.

According to one embodiment of the present technology, the output control section may determine the output of the image display light on the basis of target image display light brightness and the pupil area or size.

According to one embodiment of the present technology, the output of the image display light may be determined such that the target image display light brightness and a value obtained by dividing the output of the image display light by the pupil area or size satisfy a predetermined relationship.

According to one embodiment of the present technology, the predetermined relationship may be represented by the following equation $$L = C \int \frac{P(\lambda) \times K(\lambda)}{\omega \times A} d\lambda$$

or the following equation $$L = C \sum_\lambda \frac{P_\lambda \times K_\lambda}{\omega \times A}$$

(where L denotes the target image display light brightness, C denotes an adjustment factor, $\lambda$ denotes a wavelength, P denotes the output of the image display light at each wavelength, K denotes visual sensitivity at each wavelength, $\omega$ denotes a display visual angle, and A denotes a pupil size or a pupil area).

According to another embodiment of the present technology, the output control section may cause the output of the image display light to change depending on at least one of a change in the pupil area or size, a change in external light illuminance, or a change in an external light contrast.

According to another embodiment of the present technology, the output control section may cause the output of the image display light to change depending on the change in the pupil area or size and may determine the output of the image display light on the basis of the pupil area or size before and after the change.

According to another embodiment of the present technology, the output control section may control the output of the image display light so as to provide image display brightness determined on the basis of the following equation $$L_1 = E_1/E_0 * A_1/A_0 * C_1/C_0 * L_0$$

(where $L_1$, $E_1$, $A_1$, and $C_1$ denote the image display brightness, the external light illuminance, the pupil area or size, and the external light contrast, respectively, after the change, and $L_0$, $E_0$, $A_0$, and $C_0$ denote the image display brightness, the external light illuminance, the pupil area or size, and the external light contrast, respectively, before the change).

According to one embodiment of the present technology, the output control section may determine the target image display light brightness on the basis of gaze point lightness and a contrast with respect to the lightness.

According to one embodiment of the present technology, the pupil information acquisition section may acquire position information of the pupil, and the pupil information acquisition section may specify the gaze point on the basis of the position information.

According to one embodiment of the present technology, the pupil information acquisition section may include an infrared camera.

According to one embodiment of the present technology, the image projection apparatus may further include a gaze point information acquisition section that acquires the gaze point lightness.

According to one embodiment of the present technology, the image projection apparatus may further include an image display light irradiation section that irradiates the retina with the image display light at an output controlled by the output control section.

According to one embodiment of the present technology, the image display light irradiation section may irradiate the image display light by a retina projection method or a retina scanning method.

According to one embodiment of the present technology, the image display light irradiation section may use laser light as an illumination light source.

According to one embodiment of the present technology, the image projection apparatus may be a head mount display.

According to one embodiment of the present technology, the image projection apparatus may be an eye wear display.

According to one embodiment of the present technology, an image to be projected may be displayed so as to be superimposed on an external scene.

In addition, the present technology provides an image projection method including a step of acquiring pupil information to acquire a pupil area or size, a step of controlling an output of image display light collected around a pupil and irradiated to a retina on the basis of a pupil area or size acquired in the step of acquiring pupil information, and a step of outputting image display light that irradiates the retina with the image display light at the output controlled in the step of controlling the output.

In addition, the present technology provides an image display light output control method including a step of acquiring pupil information to acquire a pupil area or size, and a step of controlling an output of image display light collected around a pupil and irradiated to a retina on the basis of a pupil area or size acquired in the step of acquiring pupil information.

Advantageous Effects of Invention

According to the present technology, an image that has adequate lightness and is clear can be displayed by superimposing on an external scene. It should be noted that the effects achieved by the present technology are not necessarily limited to the effects described here and may be any of effects described in the present specification.

MODE(S) FOR CARRYING OUT THE INVENTION

Figure 1:
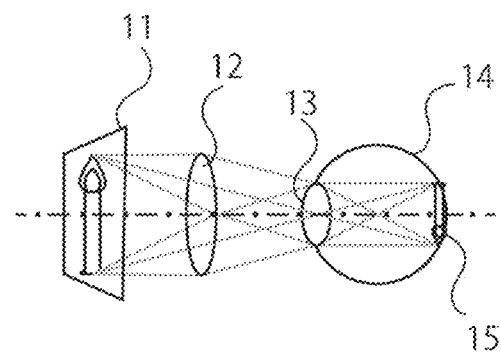
FIG. 1 is a schematic diagram illustrating an image projection method of refracting image display light at a crystal lens and imaging on a retina.

Hereinafter, embodiments of the present disclosure will be described with reference to the drawings.

Hereinafter, desirable embodiments for carrying out the present technology will be described. Note that the embodiments described below show representative embodiments of the present technology and the scopes of the present technology are not limited to these embodiments. Note that the embodiments of the present technology will be described in the following order.

1. First embodiment (image projection apparatus)
(1) Description of first embodiment
(2) First example of first embodiment (image projection apparatus)
(3) Second example of first embodiment (image display light output control by output control section)
(4) Third example of first embodiment (change in output of image display light by output control section)
2. Second embodiment (image projection method)
(1) Description of second embodiment
(2) First example of second embodiment (image projection method)

(3) Second example of second embodiment (image projection method)
3. Third embodiment (image display light output control method)
(1) Description of third embodiment
(2) First example of third embodiment (image display light output control method)
(3) Second example of third embodiment (image display light output control method)
4. Fourth embodiment (program)
5. Configuration example of apparatus

1. First Embodiment (Image Projection Apparatus)

(1) Description of First Embodiment

An image projection apparatus according to the present technology includes a pupil information acquisition section that acquires a pupil area or size, and an output control section that controls an output of the image display light being collected around the pupil and irradiated on a retina on the basis of the pupil area or size acquired by the pupil information acquisition section.

In the present technology, the image display light is collected around a pupil and irradiates the retina. In other words, the image projection apparatus according to the present technology presents an image to a user by a so-called Maxwellian view. According to the present technology, by controlling the output of the image display light collected around the pupil and irradiated to the retina on the basis of the pupil area or size, an image that has adequate lightness and is clear can be superimposed on an external scene.

In the present technology, the image display light may be collected around the pupil, for example, collected at the pupil or deviated by about several mm to several tens mm (e.g., 1 mm to 20 mm, in particular, 2 mm to 15 mm) from the pupil in an optical axis direction. In the latter case, if no focus is on the pupil, the Maxwellian view can be realized. By deviating the focus in the optical axis direction, it is possible that the user will become hard to lose the image if the image is misaligned. More specifically, the image display light can be collected at the pupil, within a crystal lens, or between a surface of a cornea and the pupil.

A general image projection method utilizes a method of refracting the image display light at the crystal lens and imaging on the retina. FIG. 1 shows an example of a schematic diagram illustrating the method. As shown in FIG. 1, the image display light forming a candle image is irradiated by a display 11, is refracted by an optical system (lens) 12, and reaches a crystal lens 13 of an eyeball 14. The image display light is refracted by the crystal lens 13 and imaged on a retina 15. For example, the apparatus described in Patent Literature 1 is also based on the method.

Figure 2:
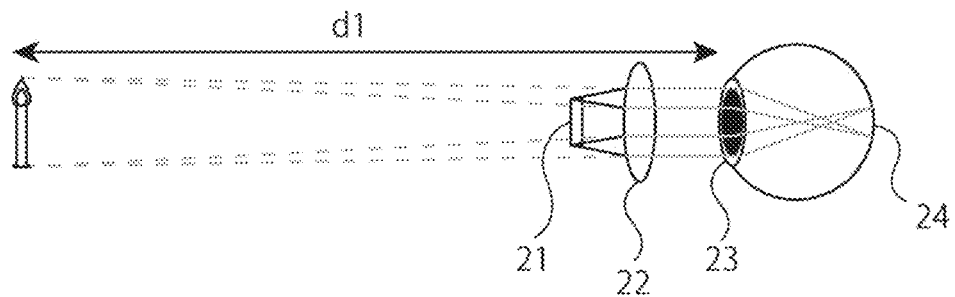
FIG. 2 is a schematic diagram illustrating the image projection method of refracting the image display light at the crystal lens and imaging on the retina.

In the case of the image projection apparatus based on the above-described method, as shown in FIG. 2, for example, the image display light irradiated from a micro panel 21 is refracted by a lens 22 and reaches a crystal lens 23 as light with a large diameter, in particular, parallel light. In an image projection by this method, an image focus is fixed on one point, and a distance d1 from the image to the crystal lens 23 is fixed. Then, in order to clearly recognize the image, it needs to adjust a focus distance of the crystal lens 23. Accordingly, there may be a case that it is impossible to clearly view the image corresponding to a status of the crystal lens 23 of the user.

In addition, in the above-described image projection method, the image viewed by the user is changed depending on a pupil diameter of the user. The pupil diameter of the user is changed by the focus distance of the crystal lens and/or a degree of gaze. In the above-described image projection method, when the pupil diameter of the user is changed, an amount of light reaching the retina is changed and a light intensity of the image presented to the user is also changed even if the image display light is the same. As a result, the image recognized by the user becomes unstable.

Figure 3:
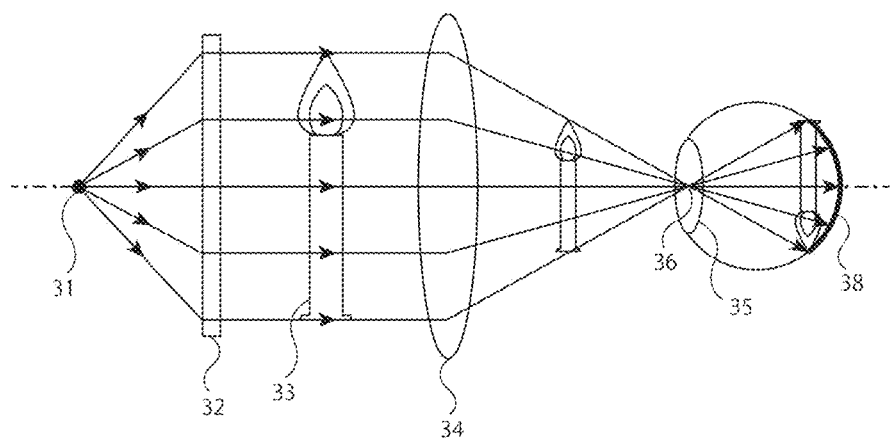
FIG. 3 is a schematic diagram illustrating an image projection method utilized by the present technology.

On the other hand, the present technology utilizes an image projection method that the image display light passes through a center of the crystal lens and the retina is irradiated therewith. FIG. 3 shows a schematic diagram illustrating the method. As shown in FIG. 3, image display light 33 forming a candle image is generated by irradiating a display 32 with back light output from a light source 31, for example. The image display light 33 is refracted so as to be collected around the pupil by an optical system (for example, lens) 34 (for example, so as to pass through center 36 of crystal lens). The light passing through the center of the lens is not refracted by the lens. As a result, the image display light reaches a retina 38 without refracting by a crystal lens 35.

Figure 4:
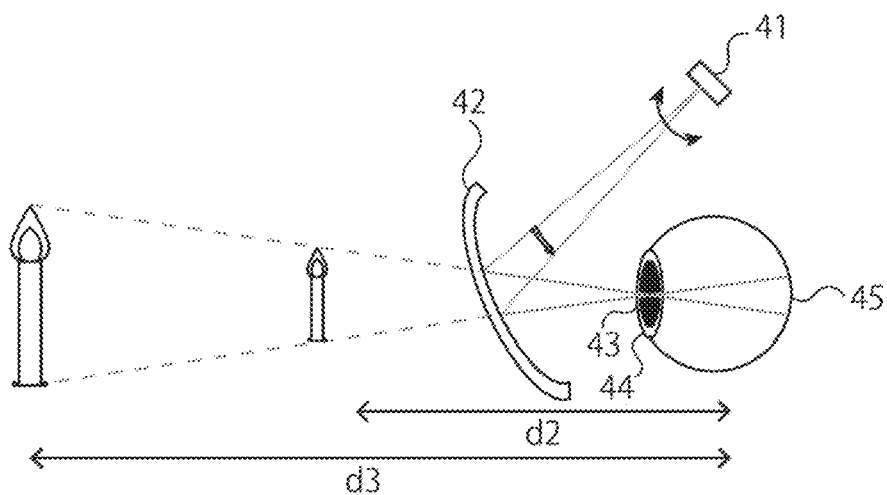
FIG. 4 is a schematic diagram illustrating the image projection method utilized by the present technology.

According to the present technology, as shown in FIG. 4, for example, the image display light irradiated from an image display light irradiation section 41 is reflected by an optical system (e.g., half mirror) 42 and reaches a crystal lens 44. The image display light is collected around the pupil, i.e., passes through a center 43 of the crystal lens 44. Thus, the image display light is not refracted by the crystal lens 44 and reaches a retina 45. As a result, even if the crystal lens 44 is incapable of adjusting the focus distance, clearness of the image recognized by the user is not significantly affected thereby.

Furthermore, according to the present technology, since the image display light passes through one point around the pupil, the amount of light reaching the retina is not changed if the pupil diameter is changed. As a result, the image recognized by the user becomes stable.

In addition, in the method utilized by the present technology, the image display light is focused on at any focus distance. For example, the image display light is focused on at any of distances d2 and d3 in FIG. 4.

Furthermore, in the image projection method utilized by the present technology, if the pupil diameter is changed, the amount of light reaching the retina is not changed, as described above. For example, when an external field becomes bright, the amount of light reaching the retina does not change even if the pupil diameter becomes small. As a result, adequate image display brightness may not be provided. Then, according to the present technology, the output of the image display light is controlled on the basis of the pupil area or size acquired by the pupil information acquisition section. As a result, since the image display brightness is controlled on the basis of the pupil area or size, it is possible to present an image having adequate rightness to the user.

(2) First Example of First Embodiment (Image Projection Apparatus)

Figure 5:
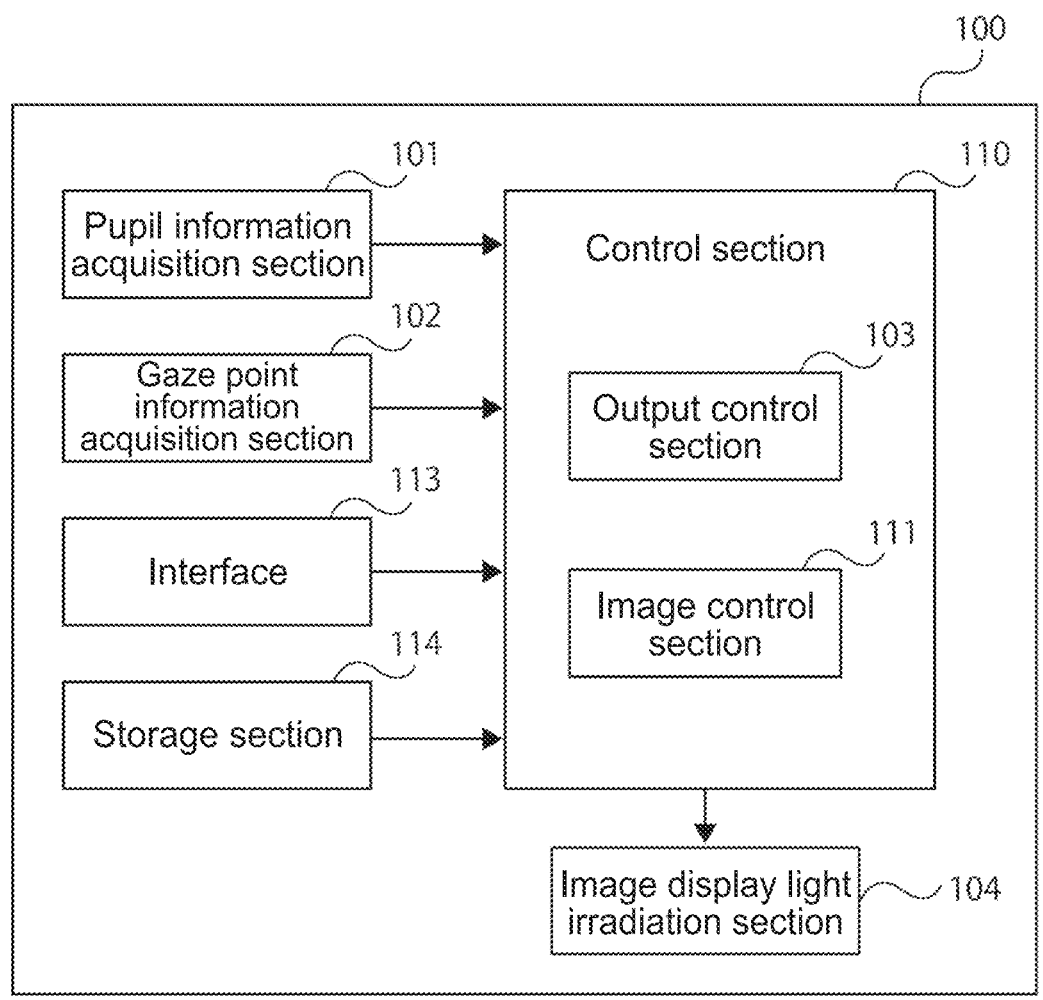
FIG. 5 is a block diagram of an example of the image projection apparatus according to the present technology.

In the following, an example of the image projection apparatus according to the present technology and an example of an image display light output control in the image projection apparatus will be described with reference to FIG. 5. FIG. 5 is a block diagram of an example of the image projection apparatus according to the present technology.

As shown in FIG. 5, an image projection apparatus 100 includes a pupil information acquisition section 101, a gaze point information acquisition section 102, a control section 110, and an image display light irradiation section 104. The control section 110 includes an output control section 103 and an image control section 111. The image projection apparatus 100 further includes a communication interface 113 and a storage section 114.

The image projection apparatus 100 is an apparatus that collects the image display light around the pupil and irradiates to the retina, to thereby presenting the image to the user. Non-limiting examples of the image projection apparatus of the present technology include an eye wear display and a head mount display. Alternatively, the image projection apparatus of the present technology may be used by mounting to glasses. The image projected by the image projection apparatus of the present technology may be displayed by superimposing on the external scene, for example. Alternatively, an image to be projected by the image projection apparatus of the present technology may be displayed by superimposing on an image to be projected by other image projection apparatus.

The pupil information acquisition section 101 is capable of acquiring pupil information such as a pupil area, size, position, and shape. The pupil information acquisition section may be one capable of acquiring such information and may be selected by those skilled in the art, as appropriate. For example, the pupil information acquisition section 101 is capable of including an image sensor configured to be capable of imaging a surface of an eyeball.

The pupil information acquisition section 101 is capable of including a combination of an IR (infrared) light source and an IR camera, for example. The IR light source can be arranged so as to irradiate a surface of a user's eyeball with infrared rays. The IR camera can be arranged so as to be capable of imaging the surface of the eyeball irradiated with infrared rays. By using the combination of the IR light source and the IR camera, the pupil information can be acquired while an effect from the external scene to the light is inhibited. In addition, the pupil information can be accurately acquired not only at a bright place but also a dark place.

The pupil information acquisition section may include the image sensor such as a CCD and a CMOS. By the image sensor, the pupil information can also be acquired.

The pupil information acquisition section 101 is capable of acquiring the pupil information such as the pupil area, size, position, and shape on the basis of an image of the pupil imaged. The pupil information may be acquired by performing image processing on the imaged image.

For example, the pupil area may be acquired by counting the number of pixels corresponding to a pupil part.

For example, the pupil size (for example, diameter or perimeter length, etc.) can be determined on the basis of the imaged image, for example. In addition, on the basis of the determined pupil size, the pupil area may also be calculated.

The gaze point information acquisition section 102 is capable of acquiring information about a user's gaze point of the image projection apparatus according to the present technology. Examples of the gaze point information include a position of the user's gaze point and lightness at the position, for example.

The gaze point information acquisition section 102 is capable of including a component that can acquire the information about the user's gaze point. Examples of the component include an image sensor, for example. The image sensor can be a CCD or a CMOS, for example. By the image sensor, the external scene including the gaze point can be imaged, and target gaze point information can be extracted from resultant image data.

The position of the gaze point may be acquired by a method known to those skilled in the art. For example, a gaze direction of each eyeball can be determined from the position information of the pupil acquired by the pupil information acquisition section 101. For example, in a case where a right eye pupil is inwardly deviated 1 mm from facing to a front and a radius of the eyeball is 12 mm, the gaze direction forms an inwardly-facing angle of a tan ($1/12$) nearly equal to 4.8 degrees with respect to a front direction. Similarly, with respect to a left eye pupil, the angle formed by the gaze direction with respect to the front direction is calculated. On the basis of the calculated gaze directions of the both eyes, the position of the gaze point can be triangulatively determined.

In addition, in a case where the pupil information acquisition section 101 has a configuration that the pupil information of only one eye can be acquired, by estimating the position of the gaze point on the basis of a movement of the eyeball, for example, the position of the gaze point may be acquired. As an estimation method, a technique known to those skilled in the art may be used.

Note that the position of the gaze point may be acquired by the pupil information acquisition section.

The lightness at the position of the gaze point can be acquired from image information at the position of the gaze point of the image imaged by the gaze point information acquisition section 102. For example, the image sensor included in the gaze point information acquisition section 102 images the external scene, and data relating to the lightness at the position of the gaze point can be acquired from the image data at the position of the gaze point in the image imaged by the image sensor.

The gaze point lightness may be acquired by an illuminance sensor facing to external field, for example, or the gaze point lightness may be estimated or calculated on the basis of an observer's pupil diameter. In a case where the image is superimposed on other image light according to the present technology, e.g., in a case where caption images are superimposed on a movie, for example, the gaze point lightness may be acquired on the basis of lightness of the other image light.

The control section 110 can include, for example, the output control section 103 that controls the output of the image display light and the image control section 111 that control an image to be displayed.

The output control section 103 controls the output of the image display light on the basis of the pupil information acquired by the pupil information acquisition section 101, for example. The image display light is collected around the pupil and is irradiated to the retina.

In the control of the output, the gaze point information acquired by the gaze point information acquisition section 102 may be referred. For example, as the gaze point information, the gaze point lightness and a contrast with respect to the lightness can be used. In other words, in an embodiment, the output control section 103 can determine the target image display light brightness on the basis of the gaze point lightness and the contrast with respect to the lightness.

Examples of an image display light output control by the output control section 103 will be described in detail in the following "(3) Second example of first embodiment (image display light output control by output control section)" and "(4) Third example of first embodiment (change in output of image display light by output control section)".

The image control section 111 can acquire the image data stored in the storage section 114 and the image data via the communication interface 113. The image control section 111 can output the image display light to the image display light irradiation section 104 on the basis of the image data. The output of the image display light is controlled by the output control section 103 in the image projection apparatus 100 of the present technology.

The image display light irradiation section 104 irradiates the retina with the image display light at the output controlled by the control section 110, in particular, the output control section 103. The image display light may be one that can present the image to the user by the Maxwellian view. Examples of the image display light include laser light, for example. In addition, the image display light may be light irradiated by an LED or a CRT.

A beam diameter of the image display light irradiated by the image display light irradiation section 104 may be determined or adjusted taking the pupil diameter into consideration. The beam diameter can be, for example, 5 mm or less, desirably, 3 mm or less, more desirably, 2 mm or less, still more desirably, 0.7 mm or less.

The image display light irradiation section 104 can include an optical system that causes the image display light irradiated by the image display light irradiation section 104 to reach the retina through the pupil. The optical system may be set, for example, corresponding to a configuration of the image projection apparatus 100 and/or an illumination method of the image display light by those skilled in the art, as appropriate.

The image display light irradiation section 104 can irradiate the image display light by the Maxwellian view with, for example, a retina scanning method or a retina projection method. An image display light irradiation apparatus for irradiating the image display light by such method is known to those skilled in the art. In the present technology, the image display light irradiation apparatus known to those skilled in the art may be used.

Figure 13:
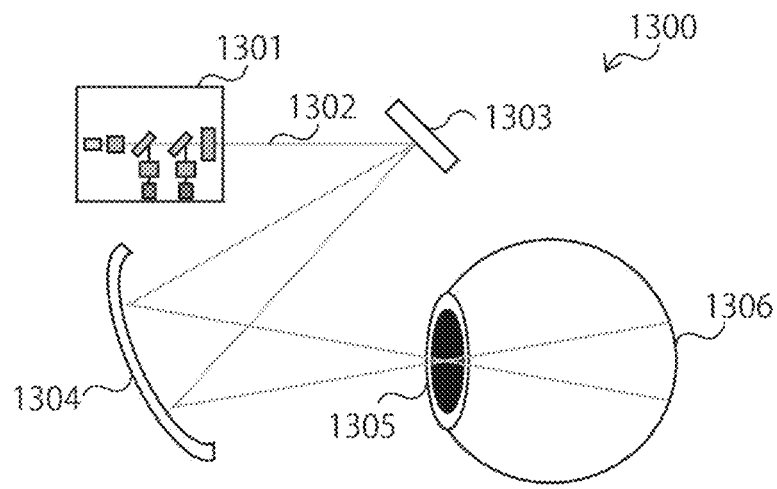
FIG. 13 is a diagram showing an example of an image display light irradiation section by a retina scanning method.

An example of the image display light irradiation section by the retina scanning method will be described below with reference to FIG. 13. FIG. 13 is a schematic diagram showing a configuration of an image display light irradiation section 1300 by the retina scanning method.

As shown in FIG. 13, laser light 1302 is output from a light source section 1301. The laser light 1302 can be output as one luminous flux including, for example, red, green, and blue laser light. The output laser light 1302 can be two-dimensionally scanned by a light scanning section 1303. The scanned laser light 1302 can extend toward an eyepiece optical system (for example, half mirror) 1304. A direction of the extended laser light 1302 is changed such that the light is collected on a user's pupil 1305 by the eyepiece optical system 1304. By changing an incident angle at high speed upon incidence, the image is displayed on a retina 1306. As a configuration of the image display light irradiation section by the retina scanning method, a configuration known to those skilled in the art may be utilized. For example, if a MEMS mirror is utilized as one of the components of the light scanning section 1303, the direction of the laser light can be moved at high speed so as to form the image on the retina.

Figure 14:
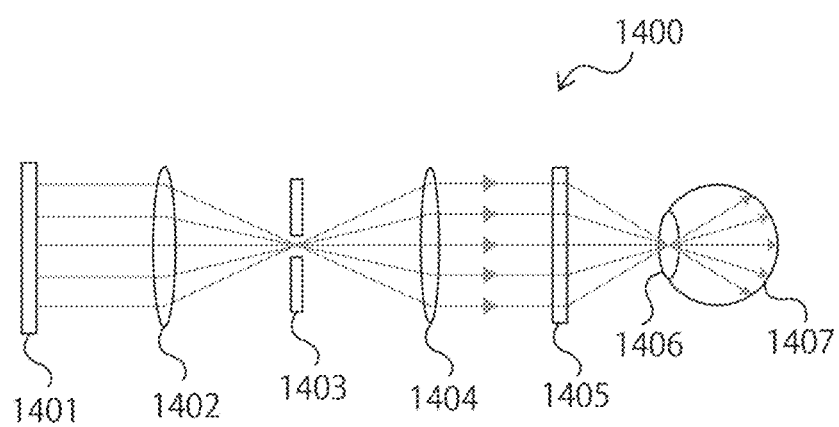
FIG. 14 is a diagram showing an example of an image display light irradiation section by a retina scanning method.

An example of the image display light irradiation section by the retina projection method will be described below with reference to FIG. 14. FIG. 14 is a schematic diagram showing a configuration of the image display light irradiation section 1400 by the retina projection method.

As shown in FIG. 14, parallel light output from a display (for example, liquid crystal device) 1401 is refracted by a lens 1402. Only desirable light of the refracted light is made to proceed to a lens 1404 by an optical filter 1403. The light passing through the lens 1404 proceeds and collected on a user's pupil 1406 by an eyepiece optical system 1405. As a result, the image is displayed on a retina 1407.

The communication interface 113 can be used to acquire the image data external of the image projection apparatus 100. For example, the image projection apparatus 100 can acquire the image data wired or wirelessly from an apparatus other than the image projection apparatus 100 or a communication network via the communication interface 113. As the communication interface 113, a measure known to those skilled in the art may be used.

The storage section 114 can store the image data for forming the image that is presented to the user by the apparatus of the present technology. The storage section 114 may temporary store the image data acquired by, for example, the communication interface 113 or may store the image data to be constantly held by the image projection apparatus 100. As the storage section 114, a measure known to those skilled in the art may be used.

(3) Second Example of First Embodiment (Image Display Light Output Control by Output Control Section)

According to one embodiment of the present technology, the output control section 103 can determine the output of the image display light on the basis of, for example, the target image display light brightness and the pupil area or size. In this manner, it is possible to present the image having adequate lightness to the user. The target image display light brightness may be brightness having a degree that the image to be presented, for example, is visually-recognizable by the user, may desirably be brightness having a degree that the image to be presented is distinguishable from the external scene by the user, more desirably, can be brightness having a degree that the image having an adequate contrast with respect to lightness of the external scene can be presented.

For example, the output control section 103 determines the output of the image display light such that the target image display light brightness and a value obtained by dividing the output of the image display light by the pupil area or size satisfy a predetermined relationship. By controlling the output of the image display light such that the predetermined relationship is satisfied, the image is presented to the user with more adequate lightness.

The output of the image display light can be a sum of a product or integration of the output of the image display light in, for example, each wavelength and visual sensitivity in each wavelength. The output of the image display light may be adjusted such that a value obtained by dividing the sum of the product or the integration by the pupil area or size satisfies a predetermined relationship between the value and the image display brightness. For example, the output of the image display light can be adjusted such that the value obtained by dividing the sum of the product or the integration by the pupil area or size equals to the image display brightness, or such that a value obtained by multiplying the value obtained by dividing the sum of the product or the integration by the pupil area or size by a predetermined adjustment factor equals to the image display brightness.

Thus, by adjusting the output of the image display light, the image having desirable lightness can be presented to the user.

The adjustment of the of the image display light such that the predetermined relationship is satisfied may be performed by using a measure known to those skilled in the art.

The predetermined relationship is represented, for example, by the following equation $$L = C \int \frac{P(\lambda) \times K(\lambda)}{\omega \times A} d\lambda \quad \text{[Math. 1]}$$

or the following equation $$L = C \sum_{\lambda} \frac{P_\lambda \times K_\lambda}{\omega \times A} \quad \text{[Math. 2]}$$

(where L [cd/m$^2$] denotes target image display light brightness, C denotes an adjustment factor, λ [nm] denotes a wavelength, P [W] denotes an output of the image display light at each wavelength, K denotes visual sensitivity at each wavelength, ω [str] is a display visual angle, and A [m or m$^2$] is a pupil size or a pupil area).

In the above-described equations, L [cd/m$^2$] denotes the target image display light brightness. The target image display light brightness may be set by, for example, the external scene and/or the image to be presented to the user, as appropriate. The target image display light brightness can be set on the basis of, for example, the gaze point information acquired by the gaze point information acquisition section 102. Specifically, the target image display light brightness may be set on the basis of, for example, the lightness at the position of the user's gaze point, and, more desirably, necessary brightness for providing a necessary contrast to the lightness can be utilized as the image display brightness. The contrast may be set depending on, for example, the external scene and/or the image to be presented to the user, as appropriate. The contrast of the gaze point lightness: the image display brightness can be, for example, 1:1 to 1:50, 1:1 to 1:30, 1:1 to 1:20, or 1:1 to 1:10. For example, if it needs to have the gaze point lightness of 100 cd/m$^2$ and the contrast of 1:10, the image display brightness is 1000 cd/m$^2$.

In the above-described equations, C may be, for example, 1. In other words, no adjustment by the adjustment factor may be performed. Alternatively, depending on the components of the apparatus according to the present technology, a value other than 1 may be used the C. Specifically, the adjustment factor based on optical characteristics included in the components of the apparatus according to the present technology may be used as the C. More specifically, in the apparatus according to the present technology, in a case where the light from the external scene reaches the user through glass (specifically, in a case where light from the external scene reaches user through ophthalmic glasses), a value based on transmittance of the glass (i.e., attenuation of lightness of external scene superimposed) may be utilized as the C. The transmittance itself may be utilized as the C. Alternatively, in the apparatus according to the present technology, in a case where the image display light reaches the user's eye via the optical system, a value based on efficiency of the optical system may be utilized as the C. Or, the optical system itself may be utilized as the C. In the present technology, a value based on both of the transmittance of the glass and the efficiency of the optical system may be utilized as the C.

In the above-described equations, A can be a light wavelength included in the image display light. In other words, a value (total sum) obtained by adding products of the output of the image display light and the visual sensitivity over a range of the light wavelength or a value obtained by integrating the products over the range of the light wavelength is utilized in the above-described equations.

In the above-described equations, P is the output of the image display light in each wavelength, and K is the visual sensitivity in each wavelength. In general, as the image display light includes light in a variety of wavelengths, it is desirable to utilize the integration of the total sum of the products of the output of the image display light and the visual sensitivity in the respective wavelengths.

In the above-described equations, w denotes a display visual angle. In other words, the w denotes a solid angle of the image display light collected around the pupil and irradiated to the retina with respect to a light collection point around the pupil.

In the above-described equations, A denotes the pupil size or the pupil area.

The transmissive image display apparatus described in Patent Literature 1 adjusts the transmittance of the light control filter and the light intensity of the image on the basis of the value of the user's pupil diameter. More specifically, the transmittance of the light control filter and the light intensity of the image are adjusted by estimating external illuminance from the value of the pupil diameter such that the image has the adequate contrast with respect to the illuminance. For example, if external light illuminance becomes 10 times, a ratio of the external light entering into the eye and image light illuminance is kept uniform by multiplying lightness of the image presented to the user by 10, decreasing the lightness of the image or the transmittance of the light control filter to ⅒, or adjusting the lightness of the image and the transmittance of the light control filter at the same time.

However, the transmissive image display apparatus described in Patent Literature 1 is based on the method of refracting the image display light by the crystal lens and imaging on the retina. In other words, the adjustment described in Patent Literature 1 is based on a premise that any of an amount of the external light reached the retina and an amount of the image light reached the retina is changed depending on a change in the pupil area. The adjustment described in Patent Literature 1 is incapable of applying to the image projection apparatus based on the Maxwellian view. For example, when the external illuminance becomes 10 times and the pupil area correspondingly becomes 0.4 times, the light intensity irradiated from the external to the retina becomes 10×0.4=4 times. In contrast, the intensity of the image display light is not affected by the pupil area. Accordingly, if the intensity of the image display light is made to be 10 times depending on the change in the external light illuminance, an intensity ratio becomes 10/4=2.5 times, which undesirably results in that the image that is too bright with respect to the external light is presented to the user.

According to the present technology, by adjusting the output of the put of the image display light, it can be prevented the image that is too bright with respect to the external light from presenting to the user.

(4) Third Example of First Embodiment (Change in Output of Image Display Light by Output Control Section)

According to other embodiment of the present technology, the output control section 103 causes the output of the image display light to change depending on at least one of a change in the pupil area or size, a change in the external light illuminance, or a change in an external light contrast, for example. In this manner, the output of the image display light can be changed to have adequate lightness depending on a change in the external scene. The output of the image display light after changing may be an output of providing brightness having a degree that the image to be presented, for example, is visually-recognizable by the user, may desirably be an output of providing brightness having a degree that the image to be presented is distinguishable from the external scene by the user, more desirably, can be an output of providing brightness having a degree that the image having the adequate contrast with respect to lightness of the external scene can be presented.

For example, the output control section 103 causes the output of the image display light to change depending on the change in the pupil area or size and determines the output of the image display light on the basis of the pupil area or size before and after the change. In this manner, the output of the image display light is determined, to thereby causing the lightness of the image to change being adequate to the user depending on the external scene.

For example, in a case where the external scene is changed, the output of the image display light is controlled so as to achieve the image display brightness set on the basis of at least one ratio (or two or three) selected from a ratio of the external light illuminance before and after change, a ratio of the external light contrast before and after change, and a ratio of the pupil area or size before and after change. In this manner, by adjusting the output of the image display light, the image having desirable lightness can be presented to the user, if the external scene is changed.

The image display brightness can be set on the basis of the following equation, for example.

$$L_1 = E_1/E_0 * A_1/A_0 * C_1/C_0 * L_0 \quad \text{[Math. 3]}$$

(where $L_1$, $E_1$, $A_1$, and $C_1$ denote the image display brightness, the external light illuminance, the pupil area or size, and the external light contrast, respectively, after the change, and $L_0$, $E_0$, $A_0$, and $C_0$ denote the image display brightness, the external light illuminance, the pupil area or size, and the external light contrast, respectively, before the change).

Each of the external light illuminance $E_1$ and $E_0$ can be acquired by, for example, the gaze point information acquisition section 102. More particularly, the external light illuminance at the position of the gaze point acquired at gaze point information acquisition section 102 can be used in the above-described equation. The external light illuminance is not limited only to the light illuminance from the external scene, but also may be the image light illuminance entering into the user's eye through, for example, the ophthalmic glasses.

Each of the external light contrasts $C_1$ and $C_0$ may be set by, for example, those skilled in the art or the user, as appropriate. For example, the external light contrast can be a contrast that satisfies the gaze point lightness: the image display brightness of 1:1 to 1:50, 1:1 to 1:30, 1:1 to 1:20, or 1:1 to 1:10. For example, in a case where it needs the image display brightness having lightness 10 times greater than the external light illuminance (lightness) in the gaze point, for example, the value of the external light contrast can be 10.

The pupil area or size $A_1$ and $A_0$, can be acquired by the method as described above in the present specification.

The output control section 103 can change the output of the image display light such that the image display brightness $L_1$ determined according to the above-described equation is achieved. The image display brightness may be achieved by controlling the output of the image display light such that the predetermined relationship is satisfied as described in, for example, the above "(3) Second example of first embodiment (image display light output control by output control section).

Since the amount of the image display light irradiated by the image projection apparatus according to the present technology is not decreased, if the external light becomes lighter, for example, 10 times, the image display light needs to be lighten not 10 times but lower times. Thus, it is possible to present the image having a high contrast at low power consumption to the user under an environment of high external light illuminance.

In addition, in a case where the image projection apparatus according to the present technology is used and, for example, in a case where the external light illuminance is changed, by multiplying a rate of change of the external light illuminance and a rate of change of the pupil area along with the change by the brightness before the change, the brightness adequate to the external light illuminance after change is set, and the output of the image display light is controlled so as to achieve such brightness. On the other hand, for example, in an image projection apparatus based on a non-Maxwellian view, in a case where the external light illuminance is changed and the same contrast before change is tried to be kept, the brightness of the image display light should be changed with the same rate of change as the rate of change of the external light illuminance. Thus, in the image projection apparatus according to the present technology, in a case where the external light illuminance becomes high, a rate to increase the brightness becomes lower.

More specifically, in the image projection apparatus based on the non-Maxwellian view, external light illuminance B is represented by $B \propto \exp(-d)$ or B $$\propto d^{-1/2},$$

or the like with respect to the pupil diameter d, i.e., B is proportional to $\exp(-d)$ or $$d^{-1/2}.$$

In the image projection apparatus based on the non-Maxwellian view, in order to keep the same contrast under different external light illuminance, the image display light should be follow the rate of change. For example, in a case where it is assumed that the B is proportional to $\exp(-d)$, the image display light is also proportional to $\exp(-d)$. On the other hand, in the image projection apparatus according to the present technology, the brightness of the image display light is proportional to $\exp(-d)*d^2$ where the external light illuminance is multiplied by the pupil area. In other words, when the pupil diameter is changed from 4 mm to 2 mm, an increase in the power consumption is ¼ as compared to the image projection apparatus based on the non-Maxwellian view.

2. Second Embodiment (Image Projection Method)

(1) Description of Second Embodiment

The present technology provides an image projection method including a step of acquiring pupil information to acquire a pupil area or size, a step of controlling an output of the image display light collected around a pupil and irradiated to a retina on the basis of a pupil area or size acquired in the step of acquiring pupil information, and a step of outputting image display light that irradiates the retina with the image display light at the output controlled in the step of controlling the output.

By the image projection method according to the present technology, the image that has adequate lightness and is clear can be superimposed on the external scene.

(2) First Example of Second Embodiment (Image Projection Method)

Figure 6:
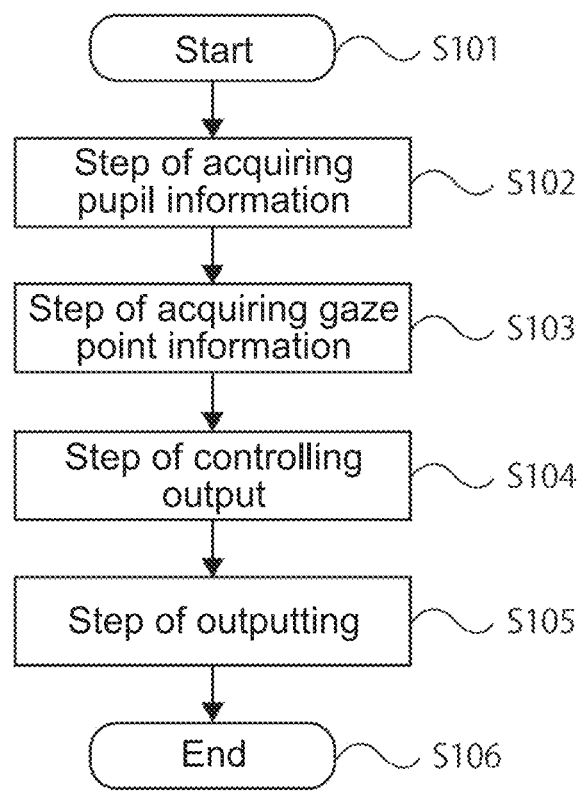
FIG. 6 is a diagram showing an example of a flow of the image projection method according to the present technology

In the following, an example of the image projection method according to the present technology will be described with reference to FIGS. 5 and 6. FIG. 5 is as described in the above "1. First embodiment (image projection apparatus)". FIG. 6 is a diagram showing an example of a flow of the image projection method according to the present technology. In the image projection method in this example, the image display light is presented to the user by the Maxwellian view with the lightness adequate to superimpose on the external scene, for example.

In Step S101, the image projection apparatus 100 according to the present technology starts image projection processing.

In Step S102, the image projection apparatus 100 acquires the pupil information. The pupil information can be acquired from the image projection apparatus 100, in particular, from the pupil information acquisition section 101. The pupil information to be acquired can be, for example, the pupil area, size, position, shape, and the like.

For example, in a case where the pupil information acquisition section 101 includes the combination of the IR (infrared) light source and the IR camera, the pupil information acquisition section 101 irradiates the surface of the eyeball with infrared rays and images the surface of the eyeball irradiated with the infrared rays in Step S102. The pupil information acquisition section 101 acquires the pupil information from the imaged image.

In Step S103, the image projection apparatus 100 acquires the gaze point information. The gaze point information can be acquired from the image projection apparatus 100, in particular, from the gaze point information acquisition section 102. Examples of the gaze point information to be acquired include, for example, the position of the user's gaze point and the lightness at the position.

For example, the gaze point information acquisition section 102 acquires the position of the gaze point on the basis of a position of the pupil acquired by the pupil information acquisition section 101. The position of the gaze point may be, for example, triangulatively determined on the basis of the positions of the pupils of both eyes, or estimated on the basis of a movement of the pupil of one eye. As a method of determining or estimating the position of the gaze point, a technique known to those skilled in the art may be used.

The gaze point information acquisition section 102 acquires the lightness at the acquired position of the gaze point. For example, the gaze point information acquisition section 102 specifies a pixel or a pixel block corresponding to the acquired position of the gaze point in the image imaged by the image sensor included in the gaze point information acquisition section 102. The gaze point information acquisition section 102 acquires data relating to the lightness in the gaze point from the image data in the specified pixel or pixel block.

In Step S104, the image projection apparatus 100 controls the output of the image display light. The control of the output of the image display light can be performed by the image projection apparatus 100, in particular, by the output control section 103. The output control section 103 controls the output of the image display light on the basis of the pupil information acquired by the pupil information acquisition section 101. The control can be performed as described in, for example, the above "(3) Second example of first embodiment (image display light output control by output control section)".

In Step S105, the image projection apparatus 100 outputs the image display light at the output controlled in Step S104. The output is performed by the image projection apparatus 100, in particular, by the image display light irradiation section 104. The image display light irradiation section 104 presents the image to the user by the Maxwellian view. Examples of the image display light include the laser light. In addition, the image display light may be light irradiated by the LED or the CRT.

In Step S106, the image projection apparatus 100 ends the image projection processing according to the present technology.

(3) Second Example of Second Embodiment (Image Projection Method)

Figure 7:
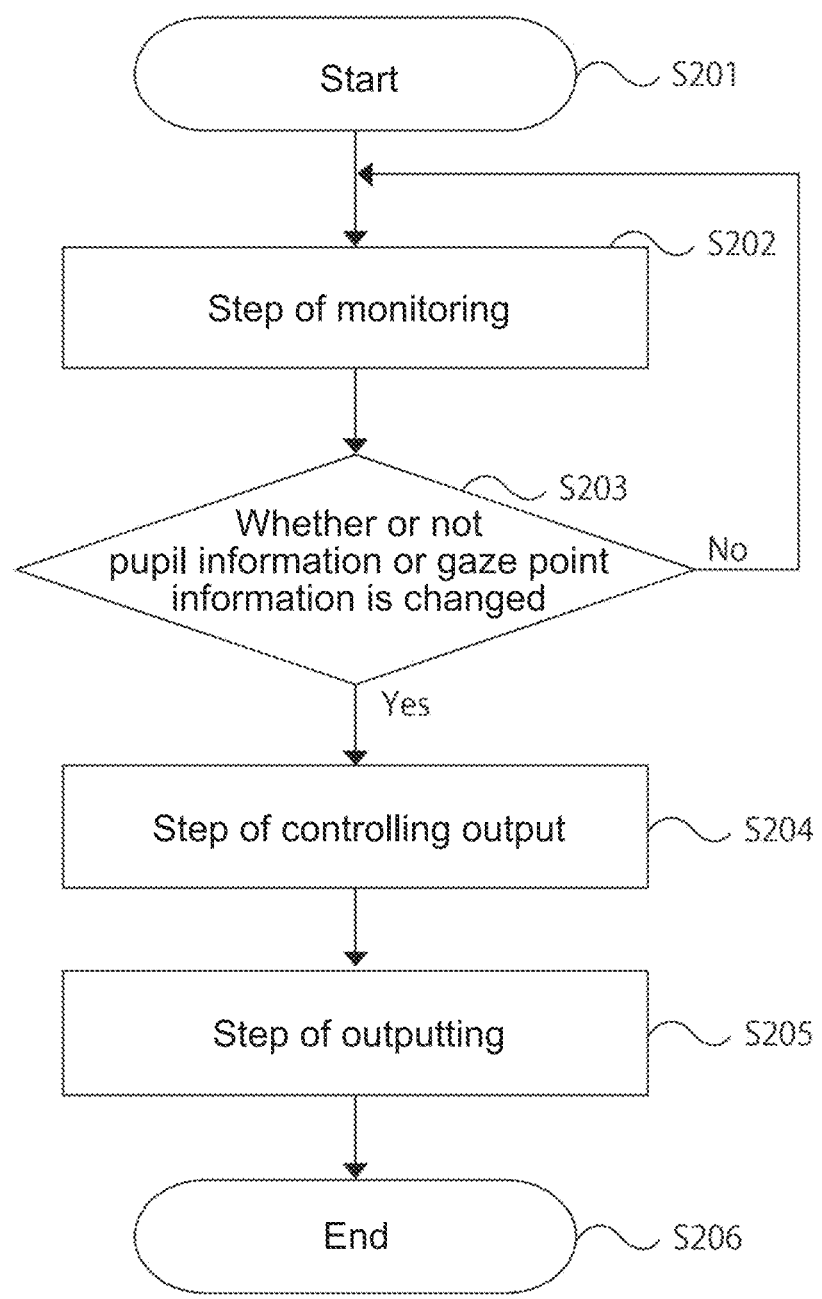
FIG. 7 is a diagram showing an example of a flow of the image projection method according to the present technology

In the following, an example of the image projection method according to the present technology will be described with reference to FIGS. 5 and 7. FIG. 5 is as described in the above "1. First embodiment (image projection apparatus)". FIG. 7 is a diagram showing an example of a flow of the image projection method according to the present technology. In the image projection method in this example, while the image display light is, for example, already irradiated to the user by the Maxwellian view, the output of the image display light is changed.

In Step S201, the image projection apparatus 100 starts the image projection processing according to the present technology.

In Step S202, the image projection apparatus 100 monitors the pupil information and/or the gaze point information. For example, in a case where the image display light is irradiated to the user from the image projection apparatus 100 by the Maxwellian view, monitoring can be performed. Monitoring of the pupil information can be performed by the image projection apparatus 100, in particular, by the pupil information acquisition section 101 and/or the control section 110. Monitoring of the gaze point information can be performed by the image projection apparatus 100, in particular, by the gaze point information acquisition section 102 and/or the control section 110.

In Step S203, the image projection apparatus 100 determines whether or not the pupil information or the gaze point information is changed. Determination of change or no-change can be performed by the image projection apparatus 100, in particular, by the output control section 103.

Examples of the change in the pupil information include, for example, an increase or a decrease in the pupil area or size. Examples of the gaze point information include, for example, a movement of the position of the gaze point, an increase or decrease in the external light illuminance (in particular, lightness) in the gaze point, and a change in the external light contrast adequate to the external light illuminance in the gaze point.

The image projection apparatus 100 proceeds the processing to Step S204 when the pupil information and/or the gaze point information is changed.

The image projection apparatus 100 returns the processing to S202 and continues the step of monitoring S202 when the pupil information and/or the gaze point information is not changed.

In Step S203, in a case where predetermined conditions are satisfied, for example, in a case where the change in the pupil information and/or the gaze point information exceeds a predetermined threshold, it may be determined that the pupil information or the gaze point information is changed.

More specifically, in Step S203, the output control section 103 determines that the pupil area or size is increased in a case where the pupil area or size becomes, for example, 1.1 times or more, 1.2 times or more, 1.3 times or more, 1.4 times or more, 1.5 times or more, 1.6 times or more, 1.7 times or more, 1.8 times or more, 1.9 times or more, or 2.0 times or more with respect to the area or size at a certain time point, and can proceed the processing to Step S204. In addition, in Step S203, the output control section 103 determines that the pupil area or size is decreased in a case where the pupil area or size becomes, for example, 0.9 times or less, 0.8 times or less, 0.7 times or less, 0.6 times or less, or 0.5 times or less, with respect to the area or size at a certain time point, and can proceed the processing to Step S204.

Alternatively, in Step S203, the output control section 103 determines that the position of the gaze point is changed in a case where the position of the gaze point is moved from an object gazed to other object at a certain time point, and can proceed the processing to Step S204. The change of the position of the gaze point can be detected on the basis of the change in the image information (e.g., change in lightness), for example, in the gaze point or around the gaze point.

Alternatively, in Step S203, the output control section 103 determines that the lightness (for example, external light illuminance) is increased in a case where the lightness becomes, for example, 1.1 times or more, 1.2 times or more, 1.3 times or more, 1.4 times or more, 1.5 times or more, 1.6 times or more, 1.7 times or more, 1.8 times or more, 1.9 times or more, or 2.0 times or more with respect to the lightness at a certain time point, and can proceed the processing to Step S204. In addition, in Step S203, the output control section 103 determines that the lightness (for example, external light illuminance) in the gaze point is decreased in a case where the lightness in the gaze point becomes, for example, 0.9 times or less, 0.8 times or less times or more, 0.7 times or less, 0.6 times or less, or 0.5 times or less, with respect to the lightness in the gaze point, and can proceed the processing to Step S204.

Alternatively, in Step S203, the output control section 103 determines that the contrast in the gaze point is changed in a case where the adequate contrast, in particular, the external light contrast between the image presented to the user and the scene on which the image is superimposed is changed, and can proceed the processing to Step S204.

In Step S204, the image projection apparatus 100 controls the output of the image display light. Controlling the output of the image display light can be performed by the image projection apparatus 100, in particular, by the output control section 103. The output control section 103 changes the output of the image display light on the basis of the pupil information acquired by the pupil information acquisition section 101 and/or the gaze point information acquired by the gaze point information acquisition section 102. The control can be performed as described, for example, in the above "(4) Third example of first embodiment (change in output of image display light by output control section)".

In Step S205, the image projection apparatus 100 outputs the image display light at the output controlled in Step S204. The output can be performed by the image projection apparatus 100, in particular, by the image display light irradiation section 104. The image display light irradiation section 104 presents the image to the user by the Maxwellian view. Examples of the image display light include the laser light. In addition, the image display light may be light irradiated by the LED or the CRT.

In Step S206, the image projection apparatus 100 ends the image projection processing according to the present technology.

3. Third Embodiment (Image Display Light Output Control Method)

(1) Description of Third Embodiment

The present technology provides an image display light output control method including a step of acquiring pupil information to acquire a pupil area or size, and a step of controlling an output of the image display light collected around a pupil and irradiated to a retina on the basis of a pupil area or size acquired in the step of acquiring pupil information.

By the image display light output control method according to the present technology, the image display light presented by the user by the Maxwellian view can be controlled to have adequate lightness.

(2) First Example of Third Embodiment (Image Display Light Output Control Method)

Figure 8:
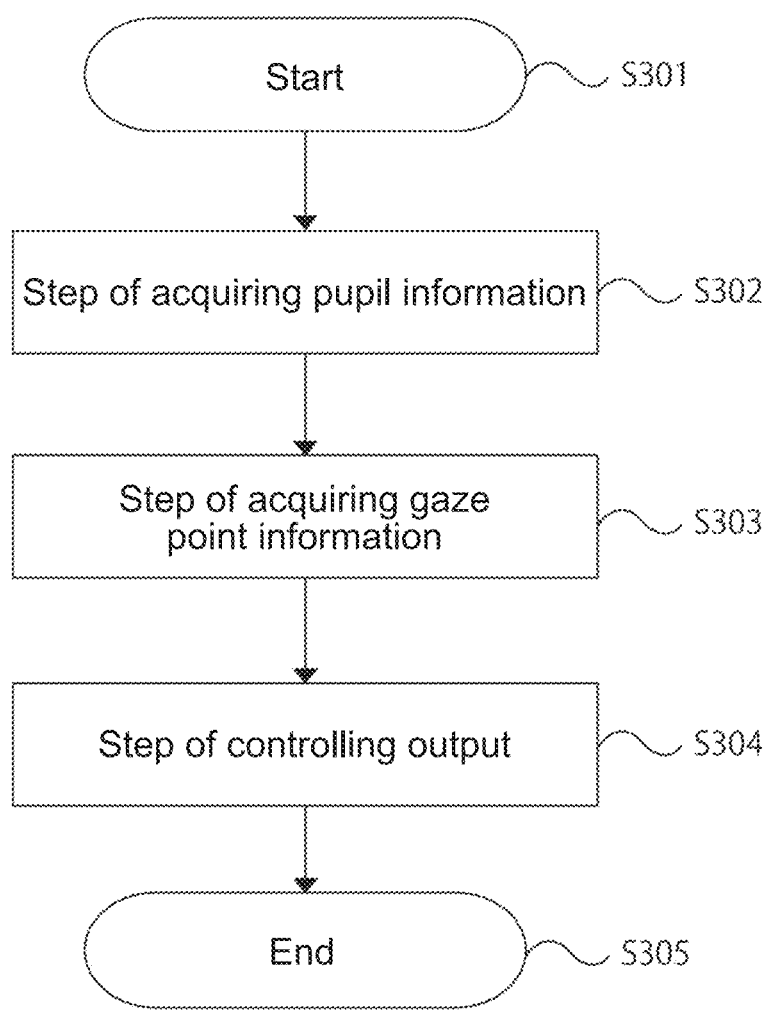
FIG. 8 is a diagram showing an example of a flow of an image display light output control method according to the present technology.

In the following, an example of the image display light output control method according to the present technology will be described with reference to FIGS. 5 and 8. FIG. 5 is as described in the above "1. First embodiment (image projection apparatus)". FIG. 8 is a diagram showing an example of a flow of the image display light output control method according to the present technology. In the image display light output control method in this example, the image display light is presented to the user by the Maxwellian view with the lightness adequate to superimpose on the external scene, for example.

Steps S301 to S305 are identical to Steps S101 to S104 and S106 described in the above 2. "(2) First example of second embodiment (image projection method)". In other words, the image display light output control method in this example is the image projection method described in the above 2. "(2) First example of second embodiment (image projection method)" excluding the step of outputting. Therefore, a description about Steps S301 to S305 will be omitted.

(3) Second Example of Third Embodiment (Image Display Light Output Control Method)

Figure 9:
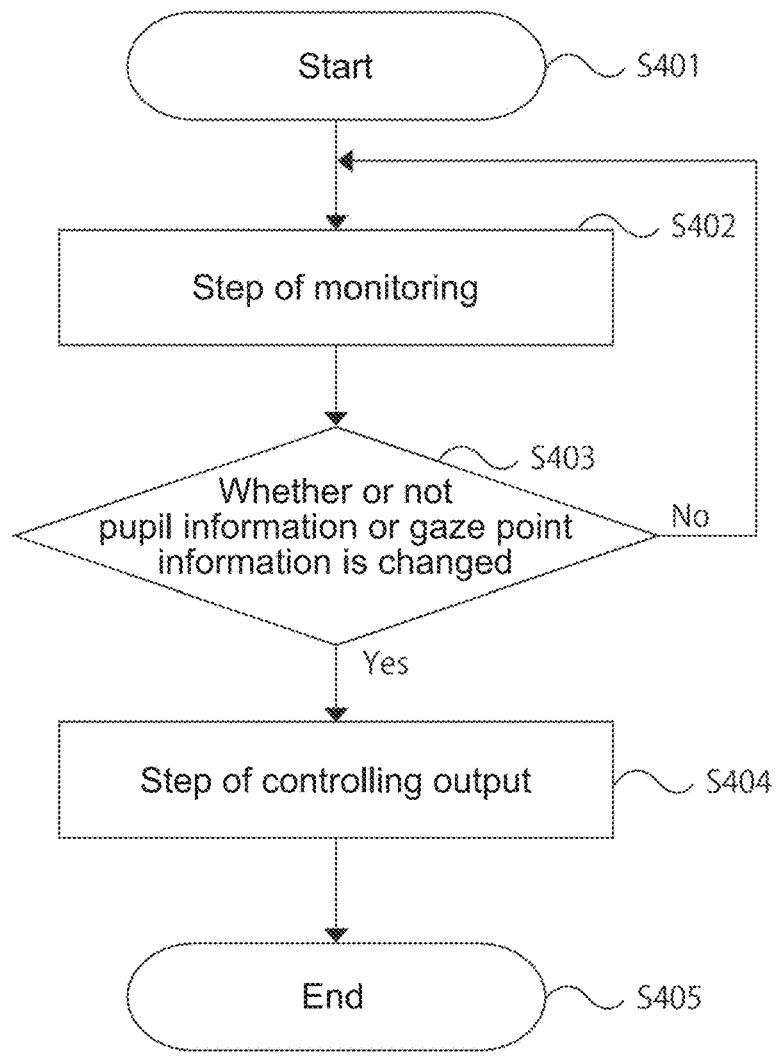
FIG. 9 is a diagram showing an example of a flow of the image display light output control method according to the present technology.

In the following, an example of the image display light output control method according to the present technology will be described with reference to FIGS. 5 and 9. FIG. 5 is as described in the above "1. First embodiment (image projection apparatus)". FIG. 9 is a diagram showing an example of a flow of the image display light output control method according to the present technology. In the image display light output control method in this example, while the image display light is, for example, already irradiated to the user by the Maxwellian view, the output of the image display light is changed.

Steps S401 to S405 are identical to Steps S201 to S204 and S206 described in 2. "(3) Second example of second embodiment (image projection method)". In other words, the image display light output control method in this example is the image display light output control method described in the above 2. "(3) Second example of second embodiment (image projection method)" excluding the step of outputting. Therefore, a description about Steps S401 to S405 will be omitted.

4. Fourth Embodiment (Program)

The present technology also provides a program for an image projection. The program for the image projection is to cause a computer to execute the image projection method according to the present technology. For example, the program for the image projection according to the present technology may cause the computer to execute a step of acquiring pupil information to acquire a pupil area or size, a step of controlling an output of the image display light collected around a pupil and irradiated to a retina on the basis of a pupil area or size acquired in the step of acquiring pupil information, and a step of outputting image display light that irradiates the retina with the image display light at the output controlled in the step of controlling the output. These steps are described in the above "2. Second embodiment (image projection method)". Therefore, a description about these steps will be omitted.

In addition, the present technology also provides a program for controlling the output of the image display light. The program for controlling the output of the image display light causes a computer to execute the image display light output control method according to the present technology. For example, the program for controlling the output of the image display light according to the present technology may cause the computer to execute a step of acquiring pupil information to acquire a pupil area or size, and a step of controlling an output of the image display light collected around a pupil and irradiated to a retina on the basis of a pupil area or size acquired in the step of acquiring pupil information. These steps are described in the above "2. Second embodiment (image projection method)". Therefore, a description about these steps will be omitted.

5. Configuration Example of Apparatus

Figure 10:
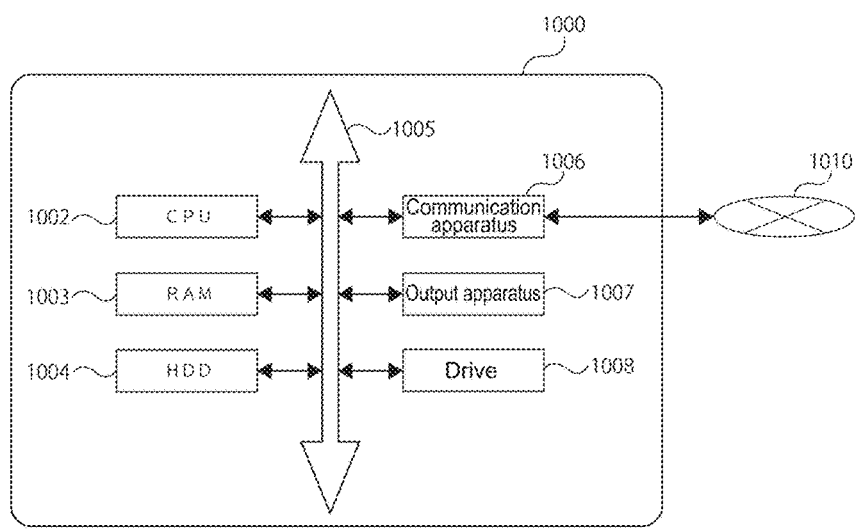
FIG. 10 is a diagram showing an example of a schematic configuration of the image projection apparatus according to the present technology.

In the following, an example of the image projection apparatus according to the present technology will be described with reference to FIG. 10. FIG. 10 is a diagram showing an example of a schematic configuration of the image projection apparatus according to the present technology.

An image projection apparatus 1000 shown in FIG. 10 includes a CPU (Central Processing Unit) 1002 and a RAM 1003. The CPU 1002 and the RAM 1003 are connected each other via a bus 1005 and are also connected to other components of the image projection apparatus 1000 via the bus 1005.

The CPU 1002 performs a control of the image projection apparatus 1000 and calculation. As the CPU 1002, any processor can be used, and examples thereof include processors of Xeon (registered trademark) series, Core (trademark) series, or Atom (trademark) series processor. The control section 110 of the image projection apparatus 100 described with reference to FIG. 5 can be realized by, for example, the CPU 1002.

The RAM 1003 includes, for example, a cash memory and a main memory and can temporary store a program and the like used by the CPU 1002.

The image projection apparatus 1000 may include a disc 1004, a communication apparatus 1006, an image display light output apparatus 1007, and a drive 1008. These components can be all connected to the bus 1005.

The disc 1004 can store an operating system (for example, WINDOWS (registered trademark), UNIX (registered trademark), or LINUX (registered trademark) etc.), a program for the image projection processing, a program for the image display light output control, other various programs, and various data (for example, image data) according to the present technology.

The communication apparatus 1006 connects the image projection apparatus 1000 to the network 1010 wired or wirelessly. By the communication apparatus 1006, the image projection apparatus 1000 can acquire various data (for example, image data, etc.) via the network 1010. The acquired data can be stored, for example, in the disc 1004. Types of the communication apparatus 1006 may be selected by those skilled in the art, as appropriate.

The image display light output apparatus 1007 can output the image display light controlled by the present technology.

The drive 1008 can read information recorded in a recording medium and output to the RAM 1003. The recording medium is, for example, an SD memory card or a flash memory, but is not limited thereto.

Figure 11:
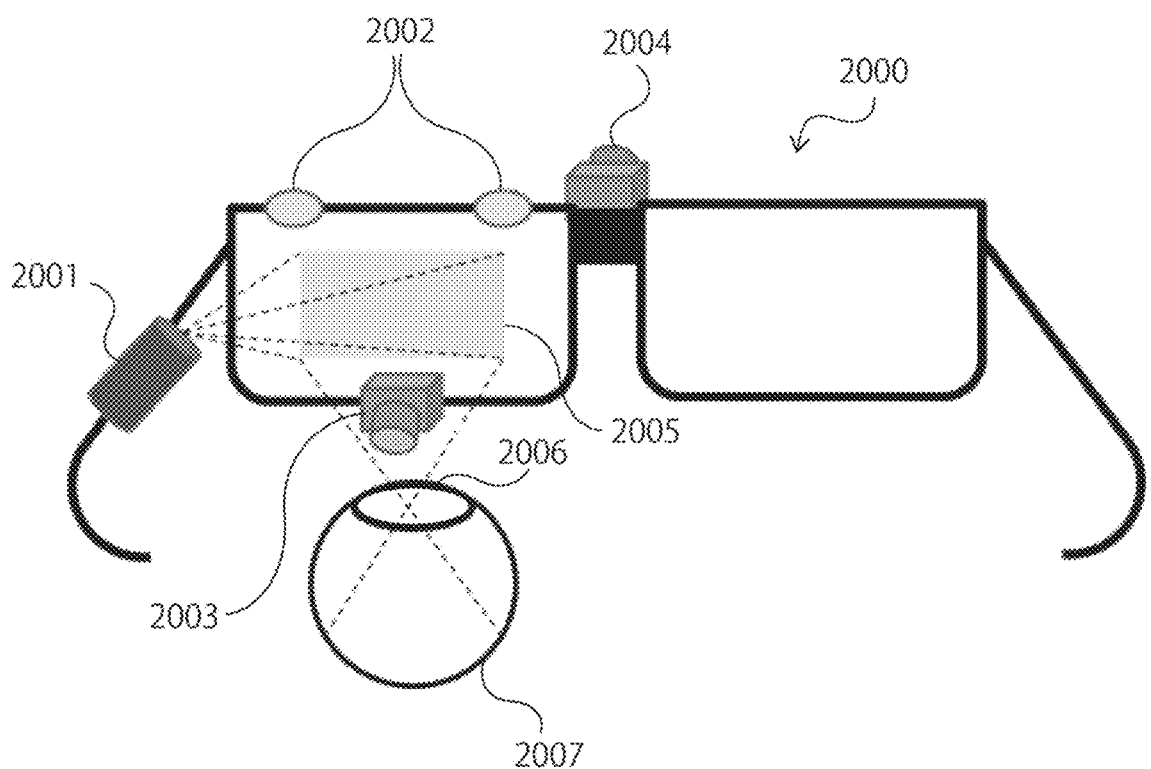
FIG. 11 is a diagram showing an example of a specific configuration of the image projection apparatus according to the present technology.
Figure 12:
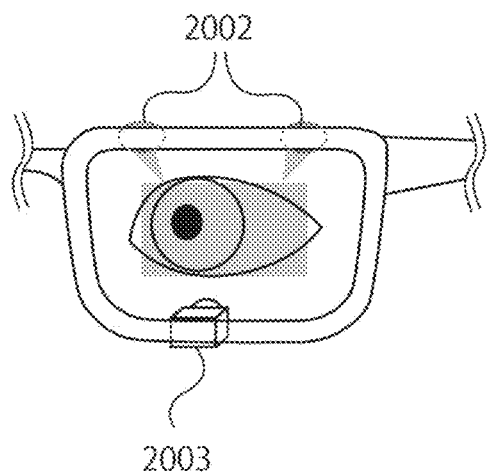
FIG. 12 is a diagram showing an example of a specific configuration of the image projection apparatus according to the present technology.

A more specific example of the image projection apparatus according to the present technology will be described with reference to FIGS. 11 and 12. FIGS. 11 and 12 are diagrams showing this example.

The image projection apparatus according to the present technology shown in FIG. 11 is an eye wear display 2000. In the eye wear display 2000, the pupil information acquisition section includes a combination of an IR light source 2002 and an IR camera 2003. The IR light source 2002 irradiates, for example, infrared rays to the eyeball, as shown in FIG. 12. While the infrared rays is irradiated and the eyeball is imaged by the IR camera 2003, the pupil information is acquired. The gaze point information acquisition section includes an image sensor 2004. The image sensor 2004 is configured such that imaging can be performed in an eyeball direction. The output control section and the image display light irradiation section may be configured as a part of an information processing apparatus of a housing 2001. The information processing apparatus may further includes an interface, a storage section, a control section, and an image control section.

By the image display light irradiation section, the image display light is irradiated to a half mirror 2005 under a control of the output control section. The image display light irradiated to the half mirror is collected on a pupil 2006 and reaches a retina 2007. Thus, the image is presented to the user by the image projection apparatus according to the present technology.

The present technology may also have the following structures.

[1] An image projection apparatus, including:
a pupil information acquisition section that acquires a pupil area or size; and
an output control section that controls an output of image display light being collected around the pupil and irradiated on a retina on the basis of the pupil area or size acquired by the pupil information acquisition section.

[2] The image projection apparatus according to [1], in which
the output control section determines the output of the image display light on the basis of target image display light brightness and the pupil area or size.

[3] The image projection apparatus according to [2], in which
the output of the image display light is determined such that the target image display light brightness and a value obtained by dividing the output of the image display light by the pupil area or size satisfy a predetermined relationship.

[4] The image projection apparatus according to [3], in which
the predetermined relationship is represented by the following equation $$L = C \int \frac{P(\lambda) \times K(\lambda)}{\omega \times A} d\lambda \qquad [\text{Math. 4}]$$

or the following equation $$L = C \sum_\lambda \frac{P_\lambda \times K_\lambda}{\omega \times A} \qquad [\text{Math. 5}]$$

(where L denotes the target image display light brightness, C denotes an adjustment factor, $\lambda$ denotes a wavelength, P denotes the output of the image display light at each wavelength, K denotes visual sensitivity at each wavelength, $\omega$ denotes a display visual angle, and A denotes a pupil size or a pupil area).

[5] The image projection apparatus according to [1], in which
the output control section causes the output of the image display light to change depending on at least one of a change in the pupil area or size, a change in external light illuminance, or a change in an external light contrast.

[6] The image projection apparatus according to [5], in which
the output control section causes the output of the image display light to change depending on the change in the pupil area or size and determines the output of the image display light on the basis of the pupil area or size before and after the change.

[7] The image projection apparatus according to [5] or [6], in which
the output control section controls the output of the image display light so as to provide image display brightness determined on the basis of the following equation $$L_1 = E_1/E_0 * A_1/A_0 * C_1/C_0 * L_0 \qquad [\text{Math. 6}]$$

(where $L_1$, $E_1$, $A_1$, and $C_1$ denote the image display brightness, the external light illuminance, the pupil area or size, and the external light contrast, respectively, after the change, and $L_0$, $E_0$, $A_0$, and $C_0$ denote the image display brightness, the external light illuminance, the pupil area or size, and the external light contrast, respectively, before the change).

[8] The image projection apparatus according to any one of [2] to [7], in which
the output control section determines the target image display light brightness on the basis of gaze point lightness and a contrast with respect to the lightness.

[9] The image projection apparatus according to [8], in which
the pupil information acquisition section acquires position information of the pupil, and the pupil information acquisition section specifies the gaze point on the basis of the position information.

[10] The image projection apparatus according to [9], in which
the pupil information acquisition section includes an infrared camera.

[11] The image projection apparatus according to [8], further including:
a gaze point information acquisition section that acquires the gaze point lightness.

[12] The image projection apparatus according to any one of [1] to [11], further including:
an image display light irradiation section that irradiates the retina with the image display light at an output controlled by the output control section.

[13] The image projection apparatus according to [12], in which
the image display light irradiation section irradiates the image display light by a retina projection method or a retina scanning method.

[14] The image projection apparatus according to [12], in which
the image display light irradiation section uses laser light as an illumination light source.

[15] The image projection apparatus according to any one of [1] to [14], in which
the image projection apparatus is a head mount display.

[16] The image projection apparatus according to any one of [1] to [14], in which
the image projection apparatus is an eye wear display.

[17] The image projection apparatus according to any one of [1] to [16], in which
an image to be projected is displayed so as to be superimposed on an external scene.

[18] An image projection method, including:
a step of acquiring pupil information to acquire a pupil area or size;
a step of controlling an output of image display light collected around a pupil and irradiated to a retina on the basis of a pupil area or size acquired in the step of acquiring pupil information; and
a step of outputting image display light that irradiates the retina with the image display light at the output controlled in the step of controlling the output.

[19] An image display light output control method, including:
a step of acquiring pupil information to acquire a pupil area or size; and
a step of controlling an output of image display light collected around a pupil and irradiated to a retina on the basis of a pupil area or size acquired in the step of acquiring pupil information.

REFERENCE SIGNS LIST

100 image projection apparatus
101 pupil information acquisition section
102 gaze point information acquisition section 103 output control section
104 image display light irradiation section
110 control section
111 image control section
113 communication interface
114 storage section

What is claimed is:

1. An image projection apparatus, comprising:
a pupil information acquisition section that acquires a pupil area or size; and
an output control section that controls an output of image display light being collected around the pupil and irradiated on a retina on a basis of the pupil area or size acquired by the pupil information acquisition section, wherein the output control section determines the output of the image display light on a basis of target image display light brightness and the pupil area or size, and wherein the output of the image display light is determined such that the target image display light brightness and a value obtained by dividing the output of the image display light by the pupil area or size satisfy a predetermined relationship.

2. The image projection apparatus according to claim 1, wherein
the predetermined relationship is represented by the following equation $$L = C \int \frac{P(\lambda) \times K(\lambda)}{\omega \times A} d\lambda \qquad \text{[Math. 1]}$$

or the following equation $$L = C \sum_\lambda \frac{P_\lambda \times K_\lambda}{\omega \times A} \qquad \text{[Math. 2]}$$

(where L denotes the target image display light brightness, C denotes an adjustment factor, $\lambda$ denotes a wavelength, P denotes the output of the image display light at each wavelength, K denotes visual sensitivity at each wavelength, $\omega$ denotes a display visual angle, and A denotes a pupil size or a pupil area).

3. The image projection apparatus according to claim 1, wherein
the output control section determines the target image display light brightness on a basis of gaze point lightness and a contrast with respect to the lightness.

4. The image projection apparatus according to claim 3, wherein
the pupil information acquisition section acquires position information of the pupil, and the pupil information acquisition section specifies the gaze point on a basis of the position information.

5. The image projection apparatus according to claim 4, wherein
the pupil information acquisition section includes an infrared camera.

6. The image projection apparatus according to claim 3, further comprising:
a gaze point information acquisition section that acquires the gaze point lightness.

7. The image projection apparatus according to claim 1, further comprising:
an image display light irradiation section that irradiates the retina with the image display light at an output controlled by the output control section.

8. The image projection apparatus according to claim 7, wherein
the image display light irradiation section irradiates the image display light by a retina projection method or a retina scanning method.

9. The image projection apparatus according to claim 7, wherein
the image display light irradiation section uses laser light as an illumination light source.

10. The image projection apparatus according to claim 1, wherein
the image projection apparatus is a head mount display.

11. The image projection apparatus according to claim 1, wherein
the image projection apparatus is an eye wear display.

12. The image projection apparatus according to claim 1, wherein
an image to be projected is displayed so as to be superimposed on an external scene.

13. An image projection apparatus, comprising:
a pupil information acquisition section that acquires a pupil area or size; and
an output control section that controls an output of image display light being collected around the pupil and irradiated on a retina on a basis of the pupil area or size acquired by the pupil information acquisition section, wherein the output control section causes the output of the image display light to change depending on at least one of a change in the pupil area or size, a change in external light illuminance, or a change in an external light contrast, and
wherein the output control section controls the output of the image display light so as to provide image display brightness determined on a basis of the following equation $$L_1 = E_1/E_0 * A_1/A_0 * C_1/C_0 * L_0 \qquad \text{[Math. 3]}$$

(where $L_1$, $E_1$, $A_1$, and $C_1$ denote the image display brightness, the external light illuminance, the pupil area or size, and the external light contrast, respectively, after the change, and $L_0$, $E_0$, $A_0$, and $C_0$ denote the image display brightness, the external light illuminance, the pupil area or size, and the external light contrast, respectively, before the change).

14. The image projection apparatus according to claim 13, wherein
the output control section causes the output of the image display light to change depending on the change in the pupil area or size and determines the output of the image display light on a basis of the pupil area or size before and after the change.

15. The image projection apparatus according to claim 13, wherein
the output control section determines the target image display light brightness on a basis of gaze point lightness and a contrast with respect to the lightness.

16. The image projection apparatus according to claim 15, wherein
the pupil information acquisition section acquires position information of the pupil, and the pupil information acquisition section specifies the gaze point on a basis of the position information.

17. The image projection apparatus according to claim 16, wherein
the pupil information acquisition section includes an infrared camera.

18. The image projection apparatus according to claim 15, further comprising:
a gaze point information acquisition section that acquires the gaze point lightness.

19. The image projection apparatus according to claim 13, further comprising:
an image display light irradiation section that irradiates the retina with the image display light at an output controlled by the output control section.

20. The image projection apparatus according to claim 19, wherein
the image display light irradiation section irradiates the image display light by a retina projection method or a retina scanning method.

* * * * *